(12) United States Patent
Schuethe (10) Patent No.: US 10,388,498 B2
(45) Date of Patent: Aug. 20, 2019

(54) GAS FLOW CONTROL

(71) Applicant: Thermo Fisher Scientific (Bremen) GmbH, Bremen (DE)

(72) Inventor: Thorben Schuethe, Bad Oldesloe (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 15/837,188

(22) Filed: Dec. 11, 2017

(65) Prior Publication Data

US 2018/0174809 A1    Jun. 21, 2018

(30) Foreign Application Priority Data

Dec. 15, 2016 (GB) .................. 1621328.2

(51) Int. Cl.

| H01J 49/00 | (2006.01) |
|---|---|
| G01F 25/00 | (2006.01) |
| G01F 1/00 | (2006.01) |
| G05D 7/00 | (2006.01) |
| F15B 13/00 | (2006.01) |
| G05D 7/03 | (2006.01) |
| H01J 49/24 | (2006.01) |
| H01J 49/10 | (2006.01) |

(52) U.S. Cl.
CPC .......... *H01J 49/0031* (2013.01); *F15B 13/00* (2013.01); *G01F 1/00* (2013.01); *G01F 25/0053* (2013.01); *G05D 7/00* (2013.01); *G05D 7/03* (2013.01); *H01J 49/005* (2013.01); *H01J 49/105* (2013.01); *H01J 49/24* (2013.01)

(58) Field of Classification Search
CPC .... H01J 49/0031; H01J 49/005; H01J 49/105; H01J 49/24; G21F 1/00; G21F 25/0053; G05D 7/00
USPC ................................................ 250/281, 282
See application file for complete search history.

(56) References Cited

U.S. PATENT DOCUMENTS

| 5,237,175 | A | 8/1993 | Wells |
|---|---|---|---|
| 5,635,620 | A | 6/1997 | Ronge et al. |
| 2004/0187927 | A1 | 9/2004 | Kang et al. |
| 2005/0067021 | A1 | 3/2005 | Bevers |
| 2010/0251828 | A1 | 10/2010 | Lee |
| 2013/0036833 | A1 | 2/2013 | Nakada |
| 2016/0327963 | A1 | 11/2016 | Hirata et al. |
| 2017/0010625 | A1 | 1/2017 | Monkowski et al. |

FOREIGN PATENT DOCUMENTS

| GB | 2537914 A | 11/2016 |
|---|---|---|
| GB | 2540365 A | 1/2017 |
| JP | 56166422 A | 12/1981 |
| WO | WO2012017812 A2 | 3/2012 |
| WO | 2015/111391 A1 | 7/2015 |

*Primary Examiner* — Nicole M Ippolito
*Assistant Examiner* — Hanway Chang
(74) *Attorney, Agent, or Firm* — A. J. Gokcek (57) ABSTRACT

The present invention relates to a gas inlet system for an analytical apparatus. The gas inlet system comprises switchable flow restrictions for regulating gas flow rate. The invention also provides a system for calibrating gas flow rate in gas inlet systems, the system comprising a calibration line that comprises a gas flow meter, and that is arranged downstream of gas flow controllers in the gas inlet system. Methods of adjusting gas flow rates and methods of calibrating gas flow rates are also provided.

24 Claims, 6 Drawing Sheets

GAS FLOW CONTROL

CROSS-REFERENCE TO RELATED APPLICATION

This application claims the priority benefit under 35 U.S.C. § 119 to British Patent Application No. 1621328.2, filed on Dec. 15, 2016, the disclosure of which is incorporated herein by reference.

FIELD

The invention relates to gas inlet systems for analytical apparatus, such as analyzers, including analyzers that operate under vacuum. The invention further relates to a method for achieving rapid changes in gas pressure and/or gas flow into an analyzer.

BACKGROUND

Inductively coupled plasma mass spectrometry (ICP-MS) is an analytical method that is capable of detecting metals and certain non-metals at concentrations at very low concentration, as low as one part in $10^{15}$ (part per quadrillion, ppq) on non-interfered low-background isotopes. The method involves ionizing the sample to be analyzed with an inductively coupled plasma and then using a mass spectrometer to separate and quantify the thus generated ions.

The plasma is generated by ionizing a gas, usually argon, in an electromagnetic coil, to generate a highly energized mixture of argon atoms, free electrons and argon ions.

Certain elements are known to have relatively poor detection limits by ICP-MS. These are predominantly those that suffer from spectral interferences generated by ions that are derived from the plasma gas, matrix components or the solvent used to solubilize samples. Examples include $^{40}Ar^{16}O$ for determination of $^{56}Fe$, $^{38}ArH$ for determination of $^{39}K$, $^{40}Ar$ for determination of $^{40}Ca$, $^{40}Ar^{40}Ar$ for determination of $^{80}Se$, $^{40}Ar^{35}Cl$ for determination of $^{75}As$, $^{49}Ar^{12}C$ for determination of $^{52}Cr$ and $^{35}Cl^{16}O$ for determination of 51V.

One solution to this problem is provided by collision cell technology (ICP-CCT) that includes a collision/reaction cell that is positioned before the analyser. Into this cell, which typically comprises a multipole operating in a radiofrequency mode to focus the ions, a collision gas such as helium or hydrogen is introduced. The collision gas collides and reacts with the ions in the cell, to convert interfering ions to harmless non-interfering species or other ions that do not cause interference.

Due to the range of interfering species that may be present, in some cases it may be advantageous to use more than one collision gas. This usually means bleeding one type of gas into the collision cell, collect data thus obtained, and subsequently switch to another collision gas. The flow of collision gas is usually in the range of about 0.2 to 10 mL/min, and is typically controlled by a mass flow controller.

In principle, it would be advantageous to use a single mass flow controller to control the flow of different types of collision gas being used. However, due to the large dead volume of mass flow controllers, a gas flush of more than 10 minutes is required when switching over collision gases before data can be collected. Therefore, in current systems a separate mass flow controller is used for each collision gas being used. Since mass flow controllers are fairly expensive, this leads to significant added cost of each instrument.

It would be desirable to provide a gas control system that only requires a single flow controller but should ideally allow more rapid switching of gases in a simple, cost-effective manner.

SUMMARY

The present invention provides improved gas inlet systems and methods that allow rapid changes in gas pressure. The invention also provides a gas inlet system that includes means for calibrating gas flow.

In a first aspect, the invention provides a gas inlet system for providing a stream of gas into an analytical apparatus. The system comprises (i) a gas inlet line, for delivering gas into the analytical apparatus, the gas inlet line being connectable to the analytical apparatus to introduce gas into the apparatus, and to at least one gas supply, to deliver gas into the gas inlet line; (ii) at least one gas flow restriction assembly that is arranged on, or fluidly connected to, the gas inlet line, the flow restriction assembly comprising at least two switchable flow restrictions; (iii) at least one control line that is fluidly connected to the gas inlet line at a control line junction, downstream from the at least one gas flow restriction assembly, the control line comprising at least one gas flow controller and at least one valve for regulating gas flow into the control line; and (iv) at least one inlet gas flow restriction that is arranged on the gas inlet line, between the control line junction and the analytical apparatus.

In general, the gas inlet system can be useful for delivering gas into an analytical apparatus or analytical instruments. The invention can for example be extended to provide such a gas inlet system in, or in combination with, a mass spectrometer, in particular a collision cell of a mass spectrometer, or an optical spectrometer. The invention can further be extended to a mass spectrometer having a gas inlet system for introducing gas into a collision cell of the mass spectrometer. Alternatively, the system can be extended to an optical spectrometer having a gas inlet system for introducing gas into the spectrometer.

Also provided is a method for of adjusting gas flow in a gas inlet system of an analytical apparatus, the method comprising steps of (i) flowing gas at an inlet pressure ($P_{in}$) from at least one gas supply into a gas inlet line that provides gas into an analytical apparatus; (ii) regulating flow rate in the gas inlet line by splitting away a portion of the gas flow in the gas inlet line into a gas control line that is arranged on the gas inlet line and that meets the gas inlet line at a control line junction, such that a portion of the gas flow in the gas inlet line flows through the gas control line, and wherein gas flow in the gas control line is controlled by means of a gas flow controller, whereby at a first setting of the gas flow controller gas flow rate in the gas inlet line and/or a pressure ($P_A$) at the control line junction reaches a constant first value; (iii) adjusting the flow controller to a second setting and while the flow controller is in the second setting, flowing gas from the gas supply at least into one or more bypass gas line that is fluidly connected to the gas inlet line, between the gas supply and the control line junction; and (iv) maintaining gas flow through the bypass gas line until gas flow and/or pressure ($P_A$) at the control line junction has reached a constant second value.

In the present context, the term "constant value" is intended to mean that the actual value deviates by less than 1% from its set value. For example, for a gas pressure setting of 100 mbar, the term "constant value" is intended to mean that the measured pressure deviates by less than 1 mbar from the set value.

The portion of gas flow that is split away from the gas inlet line into the bypass gas line can be in the range of about 0.00001% to about 99.99% of the total gas flow, such as about 0.0001% to about 99.9%, about 0.001% to about 99.9%, about 0.01% to about 99.9%, or about 0.1% to about 99.9%. The lower range that is split away can be about 0.00001%, about 0.0001%, about 0.001%, about 0.01%, about 0.1%, about 0.5% or about 1%. The upper range that is split away can be about 99.999%, about 99.99%, about 99.9%, about 99.5%, about 99%, about 98%, about 97%, about 96% or about 95%. When provided as a plurality of bypass gas lines, the portion of gas flow that is split away from the gas inlet line into the bypass gas lines can be in the range of about 0.00001% to about 99.99% of the total gas flow, such as about 0.0001% to about 99.9%, about 0.001% to about 99.9%, about 0.01% to about 99.9%, or about 0.1% to about 99.9%.

The ratio of gas flow rate through the gas inlet line to the gas flow rate through the bypass gas line, for the same pressure difference across the restrictions, can be in the range of about 1:20 to 1:1.5, preferably in the range of about 1:15 to about 1.1.5, more preferably in the range of about 1:10 to about 1:1.5, even more preferably in the range of about 1:7 to about 1:2 and most preferably in the range of about 1:5 to about 1:2.

When provided as a plurality of bypass gas lines, the ratio of gas flow rate through the gas inlet line to the total gas flow rate through the bypass gas lines, for the same pressure difference across the restrictions can be in the range of about 1:15 to about 1.1.5, more preferably in the range of about 1:10 to about 1:1.5, even more preferably in the range of about 1:7 to about 1:2 and most preferably in the range of about 1:5 to about 1:2.

The flow restriction assembly can be provided as a parallel arrangement of flow restrictions, the flow restrictions being arranged on separate flow restriction gas lines that meet the gas inlet line at a first restriction junction upstream from the flow restrictions and at a second restriction junction downstream from the flow restrictions on the gas inlet line, upstream from the control line junction. 'Upstream' is referred to in the context of the direction of gas flowing towards the analytical apparatus.

It is also possible that the second restriction junction be provided on the gas control line, upstream from gas flow controllers that are arranged on the gas control line (i.e., closer to the control line junction). In such a configuration, there are preferably no flow restrictions on the control line between the second restriction junction and the control line junction, so that the pressure at the control line junction ($P_A$) and the pressure at the second restriction junction ($P_{R2}$) are substantially similar at any given time.

By having multiple paths for gas flowing through the gas inlet line, it is possible to rapidly change pressure/gas flow in the gas inlet line by switching from a higher to a lower restriction. For this purpose, the downstream connection (second restriction junction) of the flow restriction gas line(s) should be upstream of gas flow controllers on the gas control line, but can suitably be arranged anywhere (i) upstream from such gas flow controllers on the gas control line, (ii) at the control line junction, or (iii) upstream from the control line junction on the gas inlet line, but downstream from flow restrictions that are arranged on the gas inlet line, between the gas supply and the gas control line junction.

The flow restriction assembly can also, or alternatively, be provided as a parallel arrangement of two or more flow restrictions, wherein one of the flow restrictions is arranged on the gas inlet line and wherein the second of the flow restrictions is provided on a bypass gas line that is arranged parallel to the gas inlet line and that meets the gas inlet line at a first restriction junction upstream from the flow restrictions and a second restriction junction downstream from the flow restrictions, upstream from the control line junction.

It is also possible to provide the flow restriction assembly as an arrangement comprising additional flow restrictions. Thus, the system can comprise at least one further flow restriction, wherein each such further flow restriction is arranged on a separate further gas line that is arranged parallel to the first and second flow restrictions in the flow restriction assembly.

The assembly of flow restrictions can comprise a plurality of parallel gas lines that each comprises one or more flow restriction and that meet at a first restriction junction upstream from the gas flow restrictions and a second restriction junction downstream from the gas flow restrictions.

Gas flow rate through gas lines and/or flow restrictions is in general determined by the pressure difference across gas line or flow restrictions. For example, gas flow through a first flow restriction on the gas inlet line and/or on the gas flow restriction assembly, will be determined by the pressure difference between the inlet pressure, e.g. pressure from a gas supply feeding into the gas inlet line ($P_{in}$), and the pressure at the control line junction ($P_A$). Arranging multiple, switchable, flow restrictions on the gas inlet line therefore provides improved gas flow control. It can therefore be suitable to arrange a plurality of such flow restrictions. It can be especially preferable to arrange such a plurality of restrictions as a parallel arrangement of restrictions on the gas inlet line. The plurality of restrictions can be switchable, i.e. gas can be selectively directed through one or more of the restrictions as appropriate.

One or more valves can be arranged on the gas inlet line and/or the restriction gas lines, for selectively directing flow of gas through the gas inlet line and the parallel restrictions. For example, there can be a plurality of parallel flow restrictions provided in the system. The flow restrictions thus provided can be fluidly connected to the gas inlet line at a first restriction junction, and to the gas inlet line at a second, downstream restriction junction. Alternatively, the flow restriction lines can be connected to the control line, downstream from the gas flow controller on the control line. The restriction gas lines, when provided as a plurality of gas lines, can preferably merge downstream from the restrictions, upstream from their junction with the gas inlet line and/or the gas control line.

Valves can be suitably arranged either upstream or downstream from the flow restrictions so as to be able to selectively directing and/or control gas flow through each flow restriction. The valves can be arranged as valves on each of the restriction gas lines. Alternatively there can be at least one switch valve arranged upstream of a plurality of flow restrictions, for selectively directing gas flow through one or more of the restrictions. Thus, by adjusting the position of suitably arranged valves, gas flow through the flow restrictions can be selectively controlled.

In some embodiments, the restriction assembly can comprise two parallel flow restrictions that are structured such that the ratio of gas flow through the two flow restrictions, for the same pressure difference across the restrictions, is in the range of about 1:20 to 1:1.5, preferably in the range of about 1:15 to about 1:1.5, more preferably in the range of about 1:10 to about 1:1.5, even more preferably in the range of about 1:7 to about 1:2 and most preferably in the range of about 1:5 to about 1:2.

The restriction assembly can also be provided as multiple parallel flow restrictions that are adapted such that the ratio of gas flow through any two of the flow restrictions, for the same pressure difference across the restrictions, is in the range of about 1:20 to 1:1.5, preferably in the range of about 1:15 to about 1:1.5, more preferably in the range of about 1:10 to about 1:1.5, even more preferably in the range of about 1:7 to about 1:1.5 and most preferably in the range of about 1:5 to about 1:2.

Flow restrictions, as described herein, can be selected from any suitable restrictions that are known in the art for restricting flow in gas lines. The flow restrictions can in some embodiments be fixed flow restrictions. Capillaries having appropriately small inner diameters can be used as flow restrictions for example.

In general, the gas inlet line and the gas control line can be any channel, tube, conduit, capillary or the like for transporting gas. Further, it will be apparent to the skilled person that additional components can be arranged on either or both of these gas lines, such as junctions, valves, flow restrictions, flow controllers, gauges and the like. These components can sometimes also be in fluid connection with the gas inlet line and/or the gas control line. Gas lines that are herein described as being connected can be directly connected, or they can be fluidly connected through suitable means that are known to the skilled person.

The gas flow controller on the gas control line can preferably be provided downstream from a valve for controlling gas flow in the gas control line. The gas flow controller can be open to atmosphere, or it can be connected to another gas line or a gas supply that can preferably be at or near atmospheric pressure.

The gas flow controller on the gas control line can be any suitable gas flow controller. In some embodiments, the controller is a back pressure regulator, a mass flow controller or a volume flow controller. In a preferred embodiment, the controller is a back pressure regulator.

In some embodiments of the system, at least one vacuum pump is fluidly connected to the gas control line, downstream from the gas flow controller. The vacuum pump can be provided as a single pump. The vacuum pump can also be provided as a plurality of vacuum pumps that are sequentially arranged. The exhaust of the vacuum pump can be open to atmosphere. The vacuum pump can also be a part of a vacuum pumping system of a mass spectrometer. The analytical apparatus is preferably under vacuum, e.g. using the same vacuum pump or arrangement of vacuum pumps.

The gas inlet system according to the invention can also be provided as a system that comprises a plurality of gas control lines. When provided as a plurality of gas control lines, it can be preferable that the gas control lines be connected to a single gas flow controller. As a result, a single gas flow controller can be used to regulate the flow of multiple gas types, such as collision gases. A separate mass flow controller is not required for each gas inlet line, thus saving cost. Further, it is advantageous to not position the gas flow controller directly on a gas line that feeds into the analytical apparatus. This is because gas flow controllers, such as mass flow controllers, have a fairly large dead volume that is typically not very well flushed and that moreover takes a long time to flush after changing gases. The gas inlet system in accordance with the invention provides a system that uses a single flow controller that is not in-line but rather on a separate line to control the back pressure in the gas inlet line, and as a consequence the time required for the system to reach equilibrium after switching gases is minimal, compared with conventional in-line solutions.

In one arrangement, the gas inlet system according to the invention is provided in combination with an apparatus operating at low pressure, such as a collision cell of a mass spectrometer. The gas inlet line can thus be fluidly connected to a collision cell of a mass spectrometer.

If the valves on the gas inlet line and the gas control line are both open, gas will be able to flow through the gas inlet line and the gas control line. The input pressure from a gas supply ($P_{in}$) can be defined by an external pressure reducer, e.g. at a gas flask. The gas flow controller on the control line will regulate the flow of gas in the line. The gas flow controller can be a back pressure regulator. In such a configuration, the pressure at the gas control junction ($P_A$) will be determined by the back pressure regulator. Flow of gas through the gas inlet line towards the gas control junction will be determined by the difference in pressure from the gas supply ($P_{in}$), and the pressure at the gas control junction ($P_A$) and the restrictions that are arranged on the gas inlet line. The system responds more slowly to changes in setting in the back pressure regulator, e.g. when there is a change to an increased pressure, when relatively large restrictions are present on the gas inlet line. Following a change in pressure setting by the back pressure regulator, the system (i.e., the pressure $P_A$) may therefore respond slowly. A switch to a smaller restriction on the gas inlet line, e.g. by switching gas flow to a restriction line that has less restriction (e.g. a larger inner diameter capillary), will lead to increased gas flow towards the control line junction A. As a consequence, the system reaches equilibrium faster (i.e., pressure $P_A$ stabilizes more quickly when gas flows through the lower restriction). When the system has reached equilibrium based on the new setting by the back pressure regulator, gas flow can be switched to the larger restriction (reduced gas flow), to minimize gas consumption in the system.

In general, pressure at the gas control line junction A can be adjusted to range from the pressure in the analyser (which is typically very low, in particular when the analyser is a mass spectrometer) and as high as the pressure at the gas supply ($P_{in}$). By adjusting the pressure using the back pressure regulator and the parallel restrictions on the gas inlet line, gas flow into the analyser (which will be determined by the pressure difference at A ($P_A$) and the analyser (very low)) can be regulated in a reliable and efficient fashion.

In an arrangement where the gas flow controller on the control line, for example a back pressure regulator, is open to atmosphere, the minimum pressure at the gas control line junction is approximately 1 bar (ambient pressure). However, to achieve a greater dynamic range in flow ranges in the system, it can be advantageous to operate the system at lower pressure, for example due to valve ratings, and also so as to achieve a higher range of flow rates.

Accordingly, in some embodiments of the system, at least one vacuum pump is fluidly connected to the gas control line, downstream from the gas flow controller. The vacuum pump can be provided as a single pump. The vacuum pump can also be provided as a plurality of vacuum pumps that are sequentially arranged. The exhaust of the vacuum pump can be open to atmosphere. The vacuum pump can also be a part of a vacuum pumping system of a mass spectrometer. The analytical apparatus is preferably under vacuum, e.g. using the same vacuum pump.

The flow restrictions in the system, in combination with the adjustable pressure at the control line junction, can be selected so as to provide any desirable gas flow rate downstream from the control line junction and into the analytical apparatus. Thus, gas flow rates into the analytical apparatus can in general be in the range of about 0.1 to about 100 mL/min, or about 0.2 to about 50 mL/min, or about 0.3 to about 30 mL/min. Further, depending on the gas pressure into the gas inlet line, and the gas pressure at the gas control line junction, the ratio of gas flow through a first and second flow restriction (e.g., the inlet gas flow restriction between the control line junction and the analytical apparatus) on the gas inlet line (which are preferably arranged upstream and downstream from the control line junction, respectively), when present, can take on any desired value. The first flow restriction can, in this context, be any one of, or a combination of (when more than one restriction is open to gas flow), the flow restrictions on the flow restriction assembly. In some embodiments, the ratio of gas flow through the first and second flow restriction, at a fixed gas pressure at the gas inlet, and depending on the back pressure set by the flow controller, can be in the range of about 1:1 to about 1000:1, about 1:1 to about 500:1, about 1:1 to about 100:1, about 1:1 to about 50:1 or about 1:1 to about 20:1. In some embodiments, the ratio of gas flow through first and second flow restriction can be in the range of 1:1 to 1000:1, in the range of 1:1 to 500:1, in the range of 1:1 to 100:1, in the range 1:1 to 50:1, or in the range 1:1 to 20:1. In some embodiments, the restrictions are structured such that the ratio of gas flow through the first and the at least one second flow restriction, for the same pressure difference across both restrictions, is in the range of 1:10 to 10:1, in the range of 1:8 to 8:1, in the range of 1:5 to 5:1 or in the range of 1:3 to 3:1.

It should also be noted that when the system is used with different gases, each gas can be connected to a different gas inlet line. Since different restrictions can be placed on the different lines, different flow rates can be achieved for different gases, even in the case where gas supply pressure is maintained constant. Each such gas inlet line, when present, can comprise switchable flow restrictions as described herein, to allow rapid change in gas flow rate at the control line junction A.

The flow controller on the gas control lines sets the pressure in the gas inlet line, in particular at the control line junction. Gas flow through a second flow restriction that may be present on the gas inlet line, downstream from the gas control line junction, is proportional to the difference between this pressure ($P_A$) and the pressure in the analytical apparatus. The pressure in the analytical apparatus can be less than 200 mbar, less than 100 mbar, less than 50 mbar, less than 40 mbar, less than 30 mbar, less than 20 mbar, less than 10 mbar, less than 5 mbar, less than 1 mbar, less than 0.05 mbar, less than 0.01 mbar, less than 0.005 mbar or less than 0.001 mbar. The pressure in the analytical apparatus for a first type of apparatus can be in the range of about 5 to 200 mbar, about 10 to 100 mbar, about 1 to 0.001 mbar, about 0.1 to 0.001 mbar or about 0.01 to 0.001 mbar. For a second type of analytical apparatus, the pressure in the apparatus may be about 0.1 to about $10^{-4}$ mbar, about 0.01 to about $10^{-4}$ mbar, or about 0.001 to about $10^{-4}$ mbar. Thus, for any given configuration of flow restrictions in the system, the gas flow controller can be used to set the back pressure in the gas control line and thereby the flow rate into the analytical apparatus.

By adjusting the setting of the gas flow controller, a second back pressure in the gas control line can be set, different from the first back pressure, which results in a second flow rate into the analytical apparatus. By allowing gas flow through alternative and/or additional restrictions on the gas inlet line, upstream from the gas control line junction, the system can reach rapid equilibrium (constant pressure and/or gas flow rate at the control line junction) when pressure at the control line junction is increased. When the system has reached equilibrium (i.e. the pressure at the control line junction has stabilized at a new, higher value), a switch to a higher restriction that minimizes gas flow in the system (by minimizing the amount of gas that is vented through the control line) can be made. Further adjustment of the back pressure can be made by changing the setting on the gas flow controller, so as to achieve different flow rates into the analytical apparatus. For each such further adjustment, the switchable flow restrictions on the gas inlet line can be used to reach rapid equilibrium following each change in gas flow controller settings.

A change between settings at the gas flow controller can comprise diverting gas flow through a first bypass gas line for a first period of time to achieve a first gas flow rate at the control line junction, and diverting gas flow through a second bypass gas line that is arranged in parallel with the first bypass gas line for a second period of time to achieve a second gas flow rate at the control line junction, wherein the first and second bypass gas lines comprise different flow restrictions so that flow through the two bypass lines is different for a given fixed gas pressure difference across the bypass lines. As a result, gas flow at the control line junction can be adjusted from a first flow rate to a second flow rate by selectively allowing gas flow through the first bypass gas line, and gas flow at the control line junction can be adjusted to a third flow rate by selectively allowing gas flow through the second bypass gas line. In a similar fashion, gas flow can be diverted through two or more parallel bypass gas lines to adjust gas flow rates to further gas flow settings.

The back pressure in the gas control line can in general be any value less than $P_{in}$, the pressure into the gas inlet line (the pressure at the gas supply). In the present context, "bar(g)" refers to "bar (gauge)", which is the pressure above atmospheric pressure, and "bar(a)" refers to "bar (absolute) ", which is the absolute pressure. In some embodiments, the back pressure is less than 5 bar(g), less than 1.5 bar(g) less than 1 bar(a), less than 500 mbar(a), less than 200 mbar(a) or less than 100 mbar(a). The back pressure in the gas control line may be more than 1 mbar(a), or more than 10 mbar(a) or more than 50 mbar(a) or more than 100 mbar (a). A preferred range back pressure in the gas control line may be 1.5 bar (a) to 100 mbar (a), or may be 1.5 bar (a) to 50 mbar(a), or may be 1.5 bar (a) to 10 mbar (a), or may be 1 bar (a) to 100 mbar(a), or may be 1 bar(a) to 50 mbar(a), or may be 1 bar(a) to 10 mbar(a). A wide range of flow rates can thus be achieved, for example flow rates that differ by a factor of up to 10, or up to 50, or up to 100, or up to 150, or up to 200, or up to 250.

The valve for controlling gas flow in the gas control line can suitably be provided as a valve on, or in fluid communication with, the gas control line. It is also possible that a plurality of gas control lines be provided in the gas inlet system, and wherein at least one valve for controlling gas flow in the plurality of lines is provided. The plurality of gas control lines can be each connected to a respective gas inlet line. Each such gas inlet line can comprise switchable flow restrictions as described herein. The plurality of gas control lines can also merge at one or more gas control line junction. The control lines can all merge at one junction, or they can merge at a plurality of junctions. It can be preferable that the control lines merge, through one or more gas control line junctions, into a single gas control line upstream from the gas flow controller on the gas control line. This way, a single gas flow controller can be used to regulate gas flow in the gas control lines. One or more valves can be provided on the gas control lines, for selectively controlling gas flow in the plurality of gas control lines. The valves can be provided on the individual lines and/or at the one or more gas control line junctions.

Accordingly, in a further embodiment, there can be provided in the gas inlet system according to the invention:

a plurality of gas inlet lines, each line being fluidly connected to the analytical apparatus;

at least one gas flow restriction assembly that is arranged on, or fluidly connected to, the gas inlet lines, the flow restriction assembly comprising at least two switchable flow restrictions a plurality of gas control lines, each fluidly connected to a respective gas inlet line; and wherein the gas control lines merge at one or more gas control line junction downstream from the gas flow controller.

In one embodiment, there can be a gas flow restriction assembly arranged on, or connected to, each of the plurality of gas inlet lines. The thus arranged gas flow restriction assembly can comprise two or more parallel flow restrictions, as described in the foregoing.

The gas inlet system can further comprise at least one inlet gas flow restriction ("second gas flow restriction") that is arranged on the gas inlet line, between the control line junction and the analytical apparatus.

When the gas inlet system according to the invention is provided as a system comprising a plurality of gas inlet lines, flow of gas in each gas inlet line can therefore be controlled by splitting away a portion of gas flow in each of the gas inlet lines. The flow of gas in each of the gas inlet lines can be provided by at least one gas supply. When multiple gas supplies are used, the plurality of gas inlet lines are useful for being able to switching between gases that flow into the analytical apparatus, with minimal switching time being required to reach an equilibrium with respect to gas composition in the analytical apparatus.

When provided as a plurality of gas control lines, it can be preferable that the gas control lines be connected to a single gas flow controller. One advantage of such a setup is that a single gas flow controller can be used to regulate the flow of multiple gas types, such as collision gases. A separate mass flow controller is not required for each gas inlet line compared to the prior art, thus saving cost. Further, it is advantageous to not position the gas flow controller directly on a gas line that feeds into the analytical apparatus. This is because gas flow controllers, such as mass flow controllers, have a fairly large dead volume that takes a long time to flush after changing gases.

By combining with switchable flow restrictions on the gas inlet line, there is provided a solution that uses a single flow controller that is not in-line but rather on a separate line to control the back pressure in the gas inlet line, and, by use of the switchable flow restrictions, the time required for the system to reach equilibrium after switching gases and/or after changing pressure setting is minimal, compared with conventional in-line solutions.

There can also be provided at least one flow restriction on the gas control line, or when provided as a plurality of gas control lines, on one or more of the thus provided control lines. By means of such flow restrictions, gas flow in the gas control line can be further controlled, for example to prevent or minimize risk of back-diffusion in the gas control line.

Accurate calibration of gas flow in gas inlet systems is critical to ensure that the system is indeed delivering gas at the appropriate gas flow rate. Gas inlet systems can be sensitive to changes in external conditions, in particular temperature, that may have significant impact on their physical properties. For example, mass flow through a gas line is temperature dependent due to effects of temperature on gas density and gas viscosity. As a consequence, temperature fluctuations can have significant impact on the actual gas flow rate. For example, in a gas inlet system that contains flow restrictions downstream from the gas flow controller (or controllers) that is used to regulate gas flow in the system, there can be a significant effects of temperature fluctuations, such that the actual flow rate of gas into the analytical apparatus to which the system is connected may be different from gas flow at the gas flow controller.

Precise calibration of gas flow in gas inlet systems can be problematic. This is in part due to the fact that precise calibration of mass flow dependence on control pressure is not possible due to mechanical tolerances of the capillaries that are typically used. Furthermore, to achieve high precision calibration, various properties of the system, including temperature, would have to be known to high precision.

In general, gas density is linear in pressure for any given temperature, i.e., $$\rho = \frac{1}{RT}P$$

As a consequence, the density changes linearly with pressure. Mass flow can be determined by the equation $$\dot{m} = \frac{\pi r^4}{8\eta l}(a_1 P^2 + a_0 P)$$

where $a_1$ and $a_0$ are coefficients that describe the linear relationship between density and pressure:

$$\rho(P) = a_1 P + a_0$$

Furthermore, the mass flow into the collision cell is temperature dependent, due to the effect of temperature on gas density and viscosity. As a consequence, it is desirable to maintain at least the portion of the gas inlet line downstream of the control line junction at a fixed temperature.

It would therefore be desirable to, on one hand, keep the gas inlet system (or at least a portion of it) at a constant temperature and, on the other hand, determine gas flow downstream from any gas flow controllers on the line and/or other physical components in the system that may affect flow rate and are sensitive to e.g. temperature fluctuations.

The invention provides means for achieving this. Thus, in a further aspect of the invention there is provided a system for calibrating gas flow in a gas inlet system for an analytical apparatus, the system comprising (i) a gas inlet line, for providing gas into an analytical apparatus; (ii) a gas flow calibration line that is fluidly connected to the gas inlet line via a first calibration junction, the gas flow calibration line comprising at least one gas flow meter; and (iii) at least one valve, for selectively directing gas flow either into the analytical apparatus via the gas inlet line or into the gas flow calibration line via the first calibration junction. Thereby, gas flow in the system can, in a first gas flow setting of the at least one valve, be directed into the analytical apparatus via the gas inlet line, bypassing the gas flow calibration line, and in a second gas flow setting of the at least one valve be directed via the gas flow calibration line into the analytical apparatus. As a consequence, gas flow that is measured in the gas flow calibration line in the second gas flow setting is, given a constant gas flow in the gas inlet line towards the calibration junction, a measure of the gas flow into the analytical apparatus in the first gas flow setting.

In a related further aspect, there is provided method of calibrating gas flow rate in a gas inlet system of an analytical apparatus, wherein the gas inlet system comprises at least one gas inlet line comprising at least one gas flow controller, for providing gas from at least one gas supply and into the analytical apparatus, and at least one gas calibration line that is fluidly connected to the gas inlet line at a calibration line junction, downstream from the at least one gas flow controller, the calibration line comprising at least one calibration gas flow meter.

The method can comprise steps of: (a) setting the gas flow rate into the analytical apparatus by means of the at least one gas flow controller; (b) for a first time period, flowing gas through the gas calibration line at a first flow rate that is determined by the calibration gas flow controller, and simultaneously preventing gas from flowing through the gas inlet line, downstream from the calibration line junction; (c) determining gas flow rate in the gas calibration line by means of the gas flow meter during at least a portion of the first time period; (d) for a second time period, subsequent to the first time period, flowing gas through the gas inlet line and into the analytical apparatus and simultaneously preventing gas flow through the gas calibration line; wherein during the first and second time period, the gas flow setting at the gas flow controller is maintained at a constant value, and wherein the gas calibration line and at least the portion of the gas inlet line that lies between the calibration line junction and the analytical apparatus is maintained at a constant temperature. As a result, gas flow rate that is determined in the gas calibration line during the first time period is a measure of gas flow in the gas inlet line and into the analytical apparatus during the second time period.

The calibration system should in general be placed downstream of flow controlling means in the gas inlet system, so that gas flow as calibrated by the system is not dependent on the setting of flow control parameters in the regular gas flow into the analytical apparatus, i.e. gas flow that does not pass through the calibration line.

In some embodiments, the calibration is at one end connected to the gas inlet line, downstream from gas flow controlling means, such as gas flow controllers, on the gas inlet line. At the other end, the calibration line may be connected to the gas inlet line at a downstream position, which can be close to the junction of the gas inlet line and the analytical apparatus. In one such embodiment, the calibration line is connected to the gas inlet line at a first position, downstream from gas controlling means in the system, and a second, downstream position that is just upstream from the junction of the gas inlet line and a collision cell of a mass spectrometer.

Thus, in one embodiment, the gas flow calibration line is further connected to the gas inlet line at a second calibration junction, such that gas flow in the system can, in the second setting, be directed through the gas flow calibration line, from the first calibration junction to the second calibration junction, and into the analytical apparatus via a portion of the gas inlet line that connects the second calibration junction and the analytical apparatus.

Alternatively, the calibration gas line may be connected to the analytical apparatus through a connection that is separate from the connection of the gas inlet line with the analytical apparatus. In other words, the calibration gas line may be connected to the gas inlet line at one of its ends, downstream from gas controllers in the gas inlet system, and at a downstream end to the analytical apparatus, through a connection that is physically separate from the connection of the gas inlet line and the analytical apparatus.

Accordingly, in some embodiments, the gas flow calibration line is further connected to the analytical apparatus through a calibration inlet junction that is fluidly separate from the gas inlet junction, such that gas flow in the system can, in the second setting, be directed through the gas flow calibration line, from the first calibration junction to the calibration inlet junction and into the analytical apparatus.

It should be appreciated that in general, the calibration gas flow system can be combined with any gas flow system for which it is desirable to be able to calibrate gas flow rates, in particular gas flow systems as described herein.

To ensure that the gas flow in the system does not deviate from gas flow during calibration of the system, it can be preferable to keep the calibration line and at least a portion of the gas inlet line at a constant temperature. In general, it would be advantageous to maintain the calibration line and any component of the gas inlet system that may be sensitive to changes in temperature and that are located downstream from gas flow controllers in the system at a constant temperature.

Thus, it can be preferable to maintain at least the portion of the gas inlet line that is downstream from the first calibration junction at a constant temperature. In some embodiments, it can be preferable to maintain the portion of gas inlet system that stretches from the gas flow controlling means on the gas inlet line to the analytical instrument at a constant temperature. When gas flow in the gas inlet line is controlled by means of a gas flow controller that is positioned on a gas control line, as described herein, it can be advantageous to maintain the portion of the gas inlet line that lies between the gas control line junction and the analytical apparatus at a constant temperature.

Preferably, the temperature is constant to less than 10% of its set value (in ° C.), more preferably less than 5%, even more preferably less than 4%, less than 3% or less than 2% of its set value. The temperature can alternatively be constant to less than +/−5° C., more preferably less than +/−4° C., even more preferably less than +/−3° C., less than +/−2° C., less than +/−1° C., or less than +/−0.5° C.

Accordingly, the system can further comprise a housing that is adapted to enclose the system and that further comprises means for maintaining the housing and components within the housing at a constant temperature. In general, the housing can enclose the calibration line and components of the gas inlet system that may be sensitive to effects of changes in temperature on gas flow and that are located downstream from gas flow controllers in the system. The housing can enclose at least the gas flow calibration line and the portion of the gas inlet line that stretches from the first calibration junction to the analytical apparatus. Alternatively, the housing can enclose the portion of the gas inlet line that lies between the gas control line junction and the analytical apparatus.

The system for calibrating gas flow can in general be a component of a gas inlet system as described in general herein, wherein the calibration system can typically be arranged between the inlet gas flow restriction and the analytical apparatus. In one embodiment, the calibration system is arranged to be, at an upstream end, connected to the gas inlet line, downstream from the inlet gas flow restriction, and at a downstream end to the gas inlet line, upstream from the analytical apparatus. Alternatively gas flow calibration system can at its downstream end be connected directly to the analytical instrument, bypassing the gas inlet line.

It should be appreciated that gas inlet systems according to the invention can be provided in combination with at least one gas supply. Preferably, there is also provided at least one valve for controlling flow of gas from the gas supply into the gas inlet line in the system. The system can also be configured to be used with a plurality of gas supplies. In such an arrangement, each gas supply can be connected to a respective gas inlet line. Furthermore, when present, multiple gas inlet lines can be provided with gas flow calibration lines as described in the foregoing.

The gas inlet systems described herein can be configured to include at least one controller for controlling valve position of at least one valve. The controller can preferably be adapted so that it can receive an input about at least one system parameter, for example a parameter that reflects the presence and/or absence, concentration, gas flow and/or pressure of gas in the system (e.g. at one or more points in the system), and provide a signal to at least one valve based on the parameter information. The system parameter can also include data about gas composition and/or concentration and/or pressure in a collision cell to which the gas inlet system is connected. In some embodiments, the controller is adapted to receive an input about the concentration or pressure or flow rate of at least one gas, and wherein the controller is able to adjust the position of at least one of the valves in the system based on the input parameter. In some configurations, the controller is adapted to adjust the position of at least one valve, such as at least one switch valve. The valves can therefore also be adapted to be able to receive input from a controller, to change their position depending on the signal from the controller. The controller can also be adapted to receive an input about time that has passed during one or more stages of the system, for example time that has lapsed since the type of collision gas in the system has been changed. The controller can thus be adapted to regulate the position of one or more valves based on sample gas concentration, sample gas presence or sample gas absence, or time parameters. The one or more valves controlled by the controller may comprise any one or more of the valves on any of the gas lines as described herein (e.g. valves on the gas inlet line, gas control line etc.) The controller can also be adapted to regulate the position of at least one flow controller in the system, such as a mass flow controller or back pressure regulator.

In certain embodiments of the invention, one or more of the junctions of the system are provided as a T-junction. In this context, a T-junction means any junction of three flow channels, i.e. a junction that contains three arms. The T-junction can be provided as a T-piece, as a Y-piece, or as a junction of three orthogonal channels. The junction can further be provided as a two-dimensional junction, wherein the three channels lie within the same plane, or the junction can be provided as a three dimensional structure, in which the three channels do not all lie in the same plane (i.e., as a three-dimensional "tripod").

Components of the system according to the invention, for example the gas inlet line, the flow restriction assembly, the calibration line and the gas control line, and including junctions that are described herein, can be provided in a machined block, i.e. as one mechanical piece. This means that manufacturing of the system, or portions of the system, can be performed by machining out of a bulk of material, such as a metal block. Further, using T-junctions, with or without manufacturing in a machined block, ensures that flow through the openings in the junction are under full mechanical control. The T-junction design ensures that diffusion paths are well separated, which facilitates setup and calibration of the system, because its flow properties are well determined and predictable.

Further, it should be appreciated that the invention can be combined with gas inlet systems that are known in the art, including for example carrier gas inlet systems that provide gas flow for transporting gas in analytical systems.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

It should be appreciated that the invention is applicable for analytical methods, including isotope analysis, of gases in general, by optical spectrometry, mass spectrometry or other types of spectrometry techniques. In general, therefore, the gas that is being analyzed in the system will be variable. Further, the system and method according to the invention is illustrated in the embodiments that follow with a preferred embodiment of an optical spectrometer, but it should be appreciated that the invention is also applicable to other spectrometers, including mass spectrometers.

Figure 1:
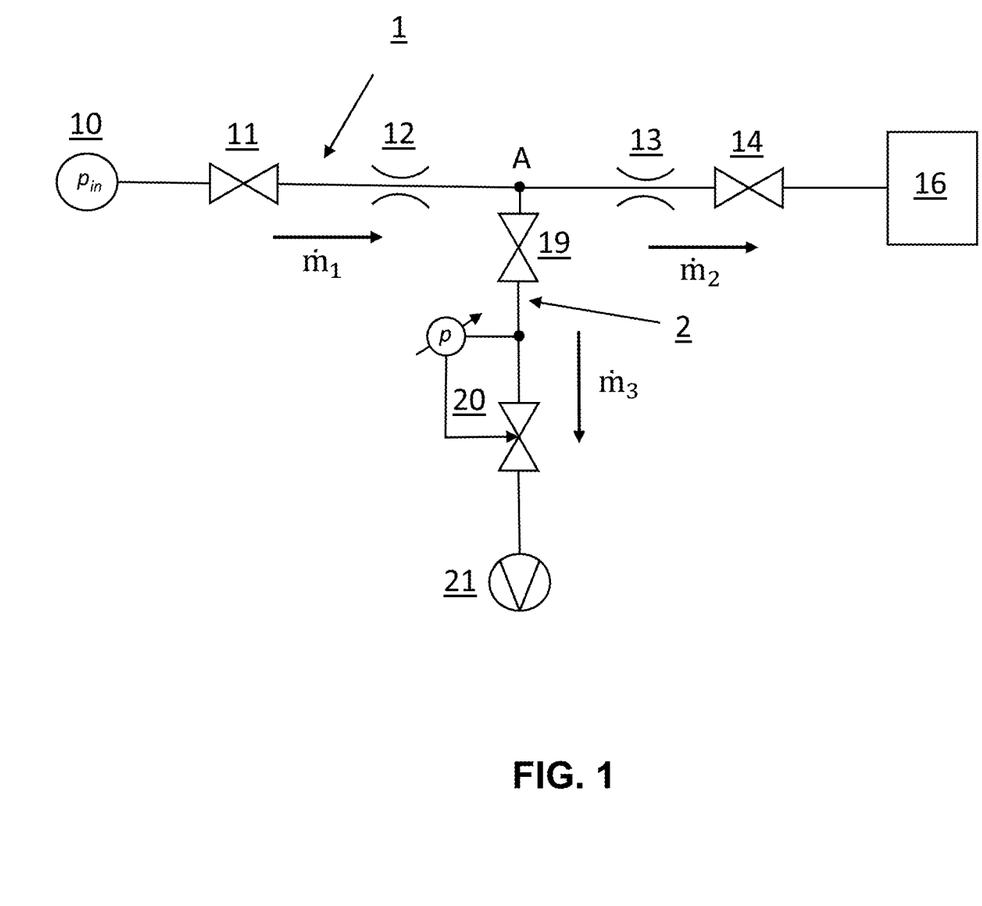
FIG. 1 shows a gas inlet system that includes a gas control line on which a gas flow controller is arranged.

Turning to FIG. 1, there is shown a gas inlet system for delivering gas from a gas supply 10 to a collision cell 16 of a mass spectrometer. The collision cell is pumped by a vacuum pump; as a consequence, the system delivers gas into the collision cell from a high to low pressure. A single gas supply 10 is shown although it will be appreciated that, in other embodiments, the gas supply 10 could be a plurality of different gas sources that are switchable in order to supply a selected gas to the collision cell. The system has a gas control line 2, that is connected to the gas inlet line 1 at a gas line junction A. A first flow restriction 12 and a second flow restriction 13 are arranged on the gas inlet line. There are also valves 11, 14 arranged on the gas inlet line and valve 19 on the gas control line 2. A back pressure regulator 20, which functions as a flow controller, is arranged on the gas control line, downstream from the valve 19. Downstream from the back pressure regulator 20 there is a vacuum pump 21. In other embodiments, the back pressure regulator may not be pumped and may instead simply exhaust to atmosphere through an exhaust line.

If gas is not to be delivered into the collision cell, valve 14, and optionally valve 19 (or valve 11) are kept closed. Opening the valves results in gas flowing through the restriction 12 towards the control line junction A. The pressure at this point in the system ($P_A$) is regulated by back pressure regulator 20. Gas flow through the restriction 12 is therefore determined by $P_{in}$, the pressure from the gas supply, and the pressure $P_A$ at the control line junction A. Gas flow continues from the control line junction, through the second flow restriction 13 and into the collision cell 16. Since the pressure in the collision cell is very low, e.g. 0.01 mbar or less, flow rate through the second restriction is controlled by $P_A$, in accordance with the Poisseuille formula.

In general, mass flow in the gas inlet system can be calculated by the equations:

$$\dot{m}_1 = \frac{1}{RT} G_1(P_{in}^2 - P_{in}P_A)$$

$$\dot{m}_2 = \frac{1}{RT} G_2(P_A^2 - P_A P_0)$$

$$\dot{m}_3 = \dot{m}_1 - \dot{m}_2$$

Where $\dot{m}_1$, $\dot{m}_2$ and $\dot{m}_a$ are the mass flow at restrictions 12, 13 and 19, respectively as shown in FIG. 1, $G_1$ and $G_2$ is the conductance of the gas inlet line upstream and downstream of junction A, respectively; $P_{in}$, $P_A$ and $P_O$ is the pressure at the gas source, control line junction and collision cell, respectively; T is temperature; and R is the gas constant.

Flow rates in the system can be adjusted by altering $P_{in}$ and/or $P_A$, and/or by changing the flow restrictions 12, 13. For example, doubling $P_A$ results in a roughly 4-fold increase in flow rate through the second flow restriction 13, a five-fold increase in $P_A$ results in more than a 20-fold increase in flow rate, and so on.

Care must be taken when configuring the system that the flow rate through the control line 2 is always high enough so that no back diffusion into the gas inlet line occurs. However, this is achievable by adjusting the pressure and restrictions in the system, and by adjusting the restriction of the gas control line.

The vacuum pump 21 can have an exhaust that is open to atmosphere. However, multiple vacuum pumps can also be used with the system, for example pumps that are sequentially arranged, with a final pump in the sequence having an exhaust to atmosphere. The vacuum pump 21 can also be a part of, or be connected to, the vacuum pump system of a mass spectrometer. The vacuum pumps 21 and 16 can, in some embodiments, be the same pump or part of the same pumping system.

The system can be set up so that gas flow of multiple gases can be individually controlled using a single flow controller. As an example the gas control line 2 can be branched so that it has a first branch that has a first junction with a first gas line carrying a first gas and has a second branch that has a second junction with a second gas line carrying a second gas. Each branch would have a valve to control the flow from each gas line (e.g. to have gas flow into one branch from one gas line but not into the other branch from the other gas line). Although the skilled person will appreciate that such a setup can be equally applied for any number of gases, through additional gas lines.

With the set-up of FIG. 1, making a transition from a low gas to a high gas pressure in the collision cell (i.e. a transition from a low gas flow rate into the cell to a high gas flow rate into the cell) can take longer than is desired. The invention aims to address this problem.

Figure 2A:
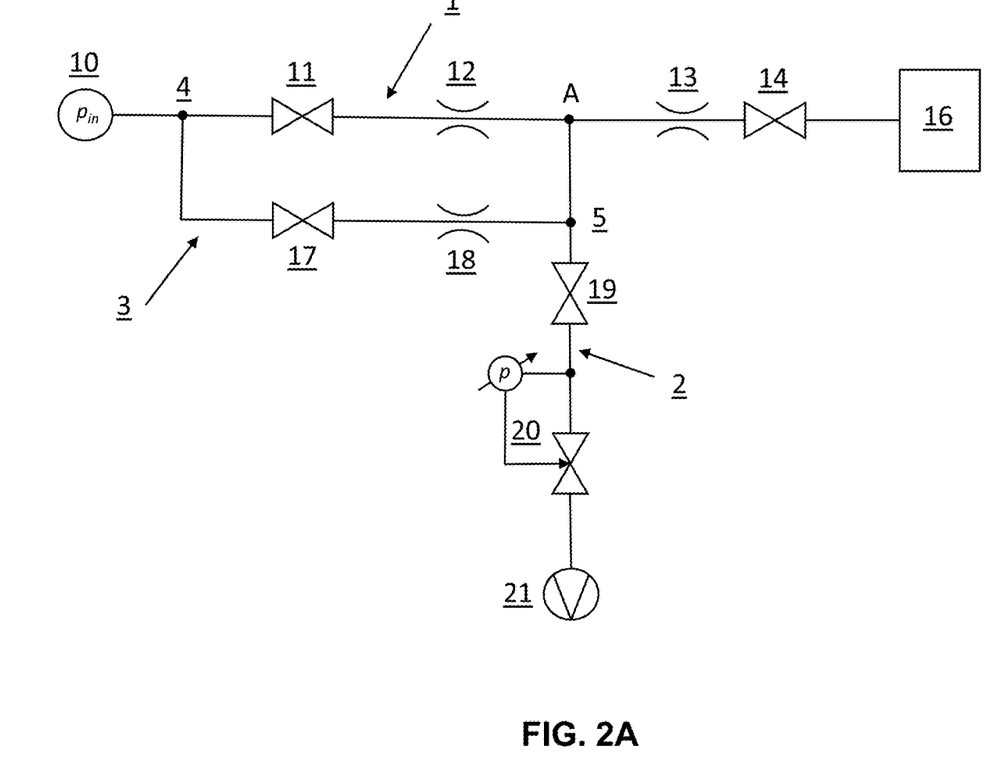
FIGS. 2A-2B shows an embodiment of the gas inlet system of the invention and which includes a bypass gas line which downstream end in (A) is connected to the gas control line and in (B) connected to the gas inlet line.

In FIG. 2A, a gas inlet system is shown that is similar to the system of FIG. 1 and therefore like parts have like references. The gas inlet system includes a bypass gas line 3 that is connected to the inlet gas line 1 at a first junction 4 and to the control line at junction 5. The bypass gas line contains a restriction 18 and a valve 17 to regulate gas flow in the bypass line. In this way, it can be seen that the additional restriction 18 is provided on the bypass line in parallel to the restriction 12 on the gas inlet line. The restriction 18 is preferably provided so as to allow greater gas flow for any given pressure at the control line junction A than restriction 12 on the gas inlet line 1. However, even a restriction 18 that provides the same or less flow than restriction 12 will still provide an increased flow rate from the gas supply 10 to control line junction A when both valves 11 and 17 are open as the total gas conductance is the sum of the conductances through restrictions 12 and 18.

Figure 2B:
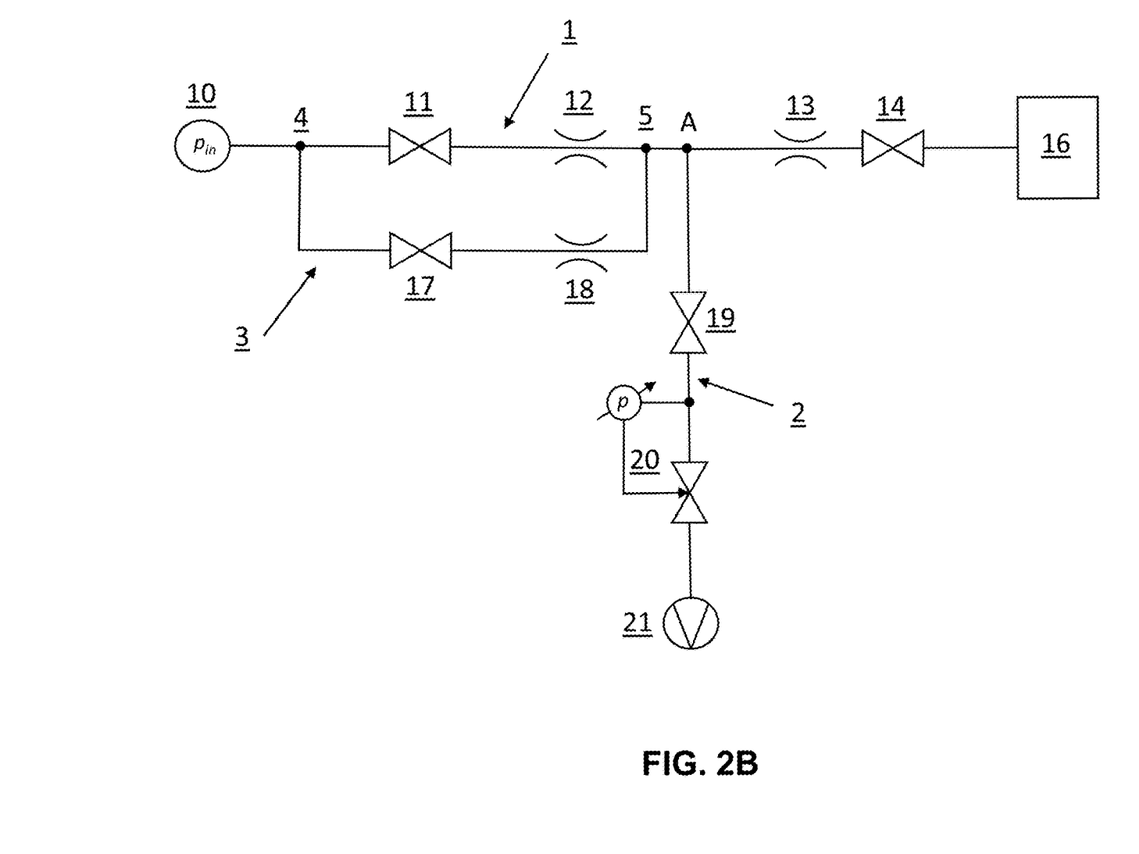

The system illustrated in FIG. 2B differs from that illustrated in FIG. 2A only in that the junction 5 (second restriction junction) is located on the gas inlet line, upstream from the control line junction A. It will be appreciated that the two configurations will provide identical results in terms of the regulation of flow rates/pressure at the control line junction. Other parts and their functionalities are identical in the illustrated systems. The following description applies to the system as illustrated in both FIG. 2A and FIG. 2B.

By allowing gas flow from the supply 10 through the bypass line 3 (by opening valve 17), there can be an increased gas flow to the control line 2 (and thereby control line junction A) when required. As a consequence, if the setting of the back pressure regulator 20 is changed to an increased pressure setting, so as to provide an increased pressure at the control line junction A (and thereby increased flow rate into the collision cell), the flow in the system will reach the new equilibrium faster when the bypass line is open compared to allowing flow through the gas inlet line 1 and restriction 12 alone. This is a consequence of the fact that the overall conductance will be increased, i.e. the total conductance $G_T$ in the two gas lines leading away from the gas source, $G_1$ (the gas inlet line) and $G_{bp}$ (the gas bypass line) is an algebraic sum of the two conductances:

$$G_T = G_1 + G_{bp}$$

If additional parallel bypass lines were provided in the system, the overall gas conductance is the sum of individual conductance of each gas line that is open to gas flow:

$$G_T = \sum_{n=1}^{N} G_n$$

where $G_n$ is the gas conductance of individual gas lines.

To minimize gas consumption in the system, the bypass line can be kept open to gas flow until the gas pressure at A ($P_A$) has reached or substantially reached a constant value (equilibrium). At this point, valve 17 can be closed and gas flow from gas tank 10 to the control junction A be determined by restriction 12.

Figure 3:
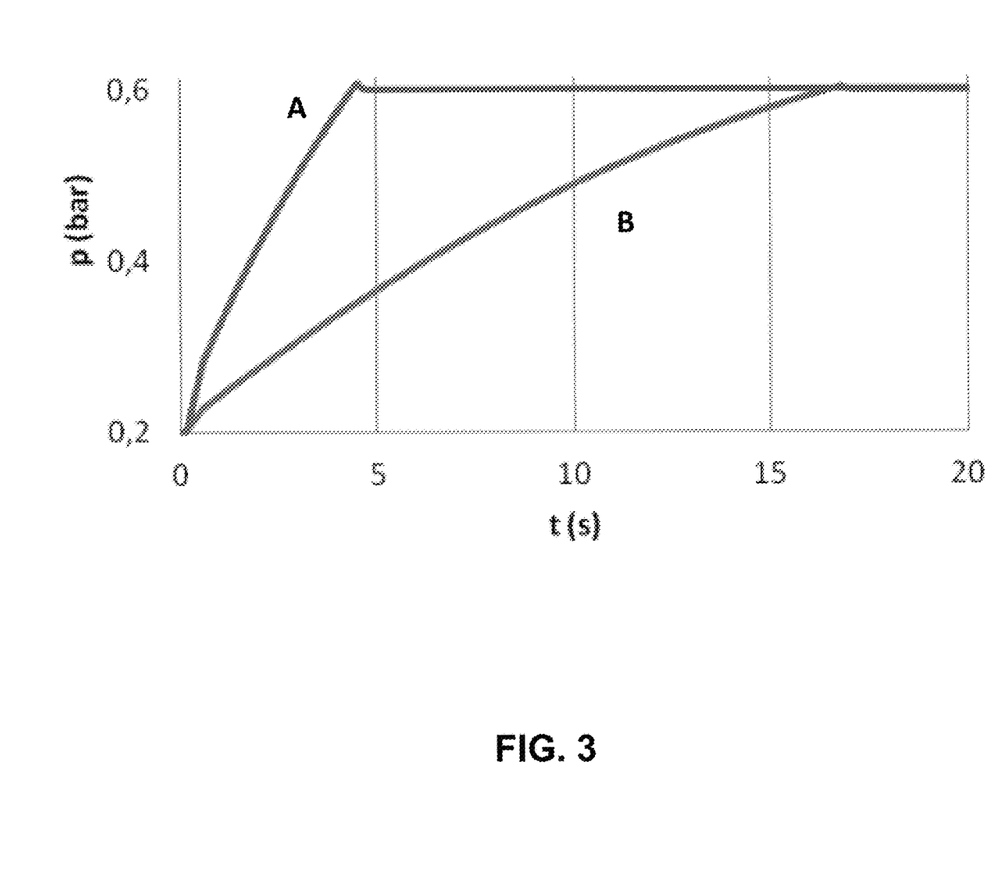
FIG. 3 shows the change in pressure at the control line junction A in the absence (A) or presence (B) of gas flow through a bypass junction as a function of time following a change in pressure setting.

The advantage of the setup is illustrated by the data shown in FIG. 3. Gas pressure at the gas control line junction A ($P_A$) is shown as a function of time, following the switch in back pressure regulator setting from 0.2 bar to 0.6 bar. The lower curve (A) shows the pressure change for a gas inlet system as shown in FIG. 1, i.e. a system that does not contain a bypass junction. Obviously, this behaviour will also be observed when there is no gas flow through the bypass gas line of the system in FIG. 2. Following change in setting of the back pressure regulator, the system responds rather slowly as shown in (A), because gas flow towards the control line junction A is determined by restriction 12. The upper curve (B) shows the advantage of the system as shown in FIGS. 2A-2B. By allowing gas flow through the bypass gas line, the system responds much faster to change in pressure settings, in the illustrated case by a factor of more than 3. In the example shown, the gas inlet line and the bypass line both have an inner diameter of 0.1 mm and a length of 10 cm and 5 cm, respectively. Alternatively, the equilibrium could be reached even faster if the restriction on the bypass line has a larger inner diameter than the restriction on the gas inlet line. The restrictions on the gas lines herein are effectively provided by the minimum inner diameters present on the respective lines. A portion of the gas line or the whole gas line could be provided with the inner diameter that provides the restriction.

When the pressure at the control junction A has reached a constant value (equilibrium) (in the illustrated case after slightly less than 5 s), valve 17 can be closed and gas flow thereby reduced to minimize gas consumption in the system. The corresponding time to equilibrium when there is no flow through the bypass gas line (or when there is no bypass gas line in the system) is, by comparison, about 16 s. The significantly shorter time needed to reach the new equilibrium pressure in the collision cell when analytical measurements can be taken enables a more efficient use of the apparatus for measurements because the apparatus is spending less time adjusting between different collision cell pressures.

For rapidly lowering the pressure at the control line junction A, the gas pump can be used to pump away excess gas. This will be most efficient if the bypass gas line is kept closed and thereby minimizing mass flow towards the control line junction, while the pump removes excess gas via the control line to reach a reduced steady state pressure.

Figure 4:
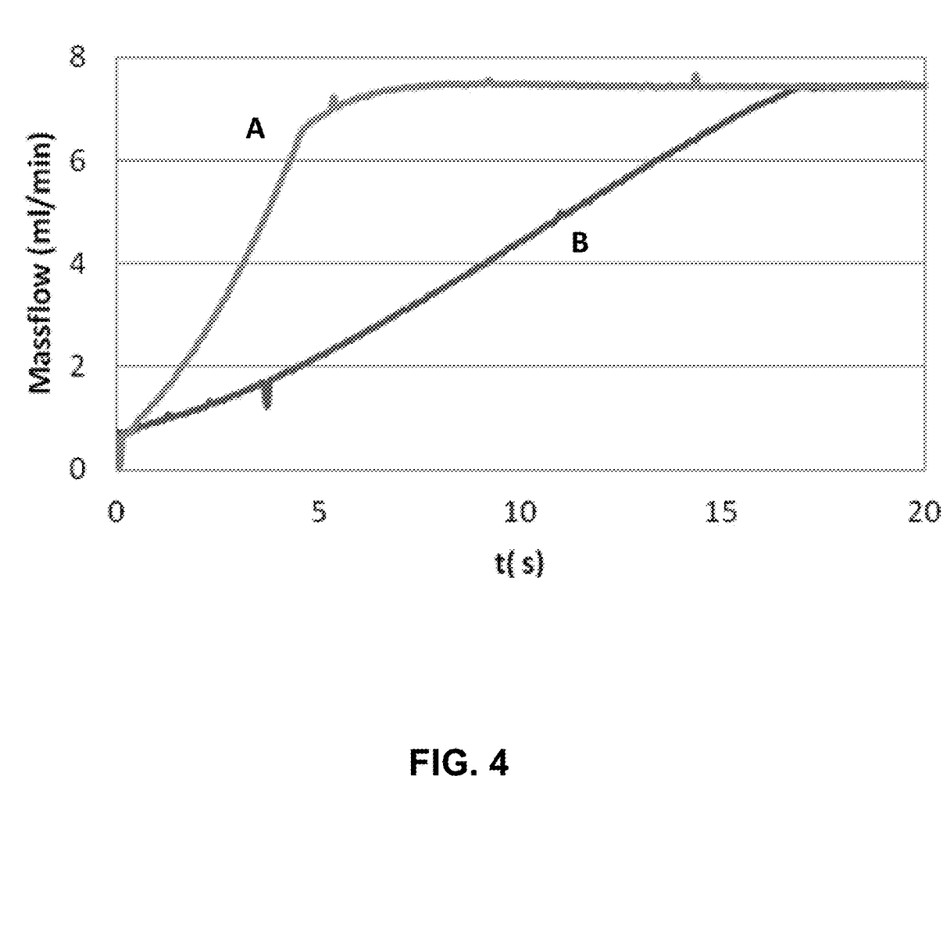
FIG. 4 shows change in mass flow at the collision cell of a mass spectrometer for a change in pressure as indicated in FIG. 3 of a gas inlet line that delivers gas into the collision cell.

In FIG. 4, corresponding data are shown, monitoring mass flow with a mass flow meter (MFM) immediately upstream of the collision cell, i.e. downstream from the gas inlet system. Due to the measurement being performed downstream from the control line junction A, there is a slight time delay in the data shown in FIG. 4 compared with the data in FIG. 3. Nevertheless, the data shows clearly the advantage of using the bypass line; the mass flow into the collision cell has reached an approximately constant value about 6 seconds after the change in pressure settings, while in the absence of the bypass line, the system takes about 17 seconds to reach equilibrium. The advantage of using the bypass line is therefore abundantly clear.

The system can be adapted to minimize gas consumption, while simultaneously allowing changes in flow rate within a significant range. Consider for example the case where it is desirable to be able to regulate flow rate between 1 and 10 mL/min into the collision cell 16. To achieve this with a single gas inlet line (no bypass gas line), there would need to be a gas flow from the gas source of at least 10 mL/min. At low gas flow settings, e.g. 1 mL/min, most of the gas (9 mL/min) is pumped away into the gas control line, and only $1/10$ of the gas actually enters the collision cell. When the gas flow into the collision cell is set to 10 mL/min, there is no gas flow in the control line. Practically speaking, a minimal gas flow of about 1 mL/min is maintained in the gas flow control line, which means that for a total flow rate of 10 mL/min from the gas supply, a maximal gas flow into the collision cell of about 9 mL/min can be achieved. Nevertheless, if the system is used for significant periods of time at low gas flow rates into the collision cell, there will be significant and unnecessary gas consumption.

The gas consumption in the system can be reduced by using one (or more than one) bypass gas line. For example, there can be two parallel gas lines (one of which is the bypass gas line), one allowing gas flow up to 5 mL/min, and the up to 10 mL/min. For low gas flow rates into the collision cell (for example flow rates ranging from 1 to 5 mL/min), the first gas line can be used exclusively. When higher flow rates are required, gas flow can be diverted into the other gas line (e.g., the bypass gas line) which allows flow rates up to 10 mL/min. Thereby, there is increased use of the gas that is delivered into the system, and the amount of gas that goes to waste (via the gas pump on the gas control line) is minimized. Alternatively, each of the parallel gas lines can allow a gas flow of up to 5 mL/min, which means that in a first setting, gas will be allowed to flow through one of the lines, for regulating gas flow rates up to 5 mL/min into the collision cell, and in a second setting, gas flows through both lines (the gas inlet line and the bypass line), for regulating gas flow rates into the collision cell from 5 mL/min up to 10 mL/min.

Obviously, additional control lines can be provided to achieve any desired flow rate, by directing gas flow through one, or any combination of, the individual gas lines. The advantage resides in the possibility to minimize excess gas flow into the system, and thereby reduce gas consumption by minimizing the amount of gas that is pumped away through the back pressure regulator on the gas control line.

Figure 5:
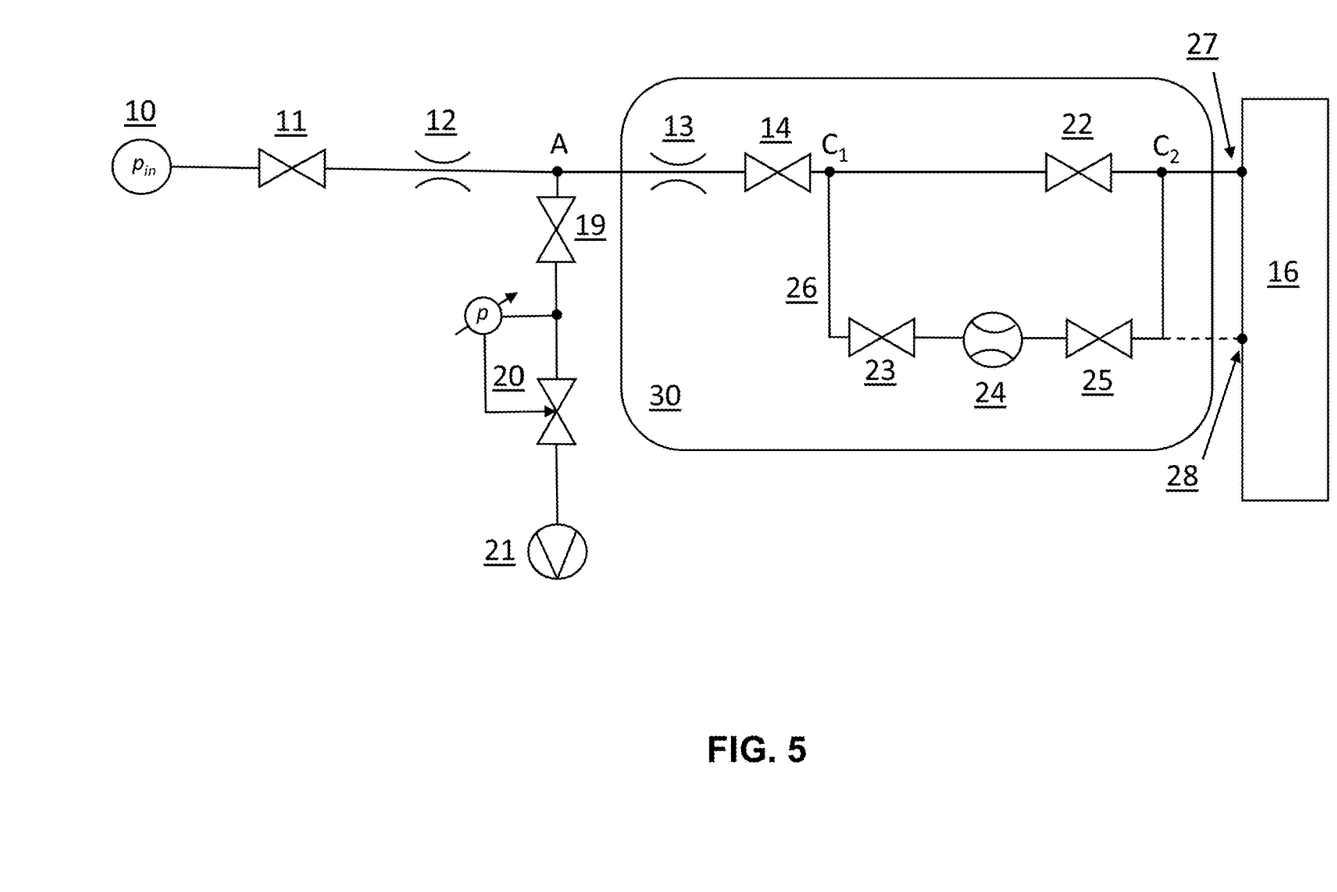
FIG. 5 shows a gas inlet line for delivering gas into the collision cell of a mass spectrometer that contains a calibration gas line, a portion of the gas inlet line and the gas calibration line being within a thermostated chamber.

In FIG. 5, a gas inlet system that comprises a calibration line for gas flow is shown. The gas inlet system shown comprises a gas inlet system as illustrated in FIG. 1, with an additional calibration line 26. There is a gas flow controller 24 on the gas calibration line, as well as two valves 23, 25. The gas calibration line meets the gas inlet line at a first calibration junction $C_1$ and a second calibration junction $C_2$. The first calibration junction $C_1$ is located downstream of the flow restriction 13 on the gas inlet line. Between the first calibration junction $C_1$ and the second calibration junction $C_2$ there is a valve 22 on the gas inlet line. Preferably, the gas calibration line is located downstream of any gas flow controllers on the gas inlet line (such as the back pressure regulator in FIG. 1 or FIG. 2), i.e. in this example downstream of the control line junction A; thereby gas flow calibration that is based on gas flow in the line will be representative of gas flow in the gas inlet line and that flows into the collision cell.

The gas calibration line and the portion of the gas inlet line that stretches from the first to second calibration junction ($C_1$, $C_2$) are placed within a thermally insulated chamber 30. The flow restriction 13 on the gas inlet line, downstream of the control line junction A, is also placed within the thermally insulated chamber. Temperature in the chamber can be adjusted using additional heating or cooling means and/or other conventional means, such as by means of a thermostat housing. Preferably restriction 13 and valve 14 are also placed within the thermally insulated chamber 30, as indicated. This way, the effects of temperature fluctuations on mass flow rate downstream of the control line junction can be minimized, thereby providing a precise calibration.

In the example shown, the calibration line meets the gas inlet line at a second calibration junction $C_2$, just upstream from the gas inlet 27 into the collision cell 16. Alternatively, the calibration gas line may be separately connected to the collision cell, i.e. via a gas connection/gas inlet 28 that is fluidly separate from the gas inlet 27, as indicated by the dashed line in FIG. 5.

Thus, by keeping the calibration line and the portion of the gas inlet line that is downstream of the control line junction (e.g. including the flow restriction 13 on the gas inlet line) at a fixed temperature, the effects of temperature fluctuations on mass flow can be minimized. As a consequence, gas flow in the gas inlet line can be determined by feeding the gas flow into the gas calibration line, by closing valve 22 on the gas inlet line and opening valve 23 (and valve 25 if previously closed), and determine gas flow rate using the mass flow meter (MFM 24) on the calibration line. Following calibration of the flow rate, valve 23 and valve 25 can be closed and valve 22 opened to allow gas flow along the gas inlet line into the collision cell that has been calibrated. The relationship of pressure versus gas flow rate as measured using the mass flow meter on the calibration line can be used to accurately set the flow rate into the collision cell, with the gas inlet line inside the thermostatic housing 30 kept at a constant temperature. A further advantage of this setup, with the mass flow meter on the separate calibration line, is that there is no large dead volume in the gas flow leading into the collision cell when, in use, the gas is flowed through the gas flow line into the collision cell. It will be appreciated that the calibration system shown in FIG. 5 can be used in combination with the 'restriction bypass assembly' system of FIG. 2.

The embodiments of FIG. 1 and FIG. 2 could be modified for calibration purposes to provide inside a thermostatic housing the gas inlet line 1 downstream of the control line junction A, including flow restriction 13, along with a flow meter MFM on the gas inlet line itself, between the control line junction and the collision cell. However, this setup would not have the advantage of avoiding the dead volume caused by the presence of the MFM.

Obviously, additional components of the gas inlet system, for example the gas control line, can be temperature controlled, for example by placing the components within a thermally controlled housing. The housing can for example comprise heat-insulating walls and comprise one or more air thermostats that maintain the housing at a constant temperature.

Further, the calibration function described in the above may be implemented on gas inlet lines in general, as long as the calibration line is placed downstream of any gas flow controllers in the gas inlet line and downstream of flow restrictions on the gas inlet line. For example, the calibration line may be implemented in any gas inlet system as described herein, e.g. gas inlet systems that contain at least one bypass line for achieving rapid steady-state gas flow following change in gas flow settings. However, the skilled person will appreciate that the calibration function may also be implemented in other gas lines of analytical systems.

While the gas inlet system of the invention has been described above in the context of providing a gas flow into a collision cell, e.g. of a mass spectrometer, it will be appreciated that the invention can be used to supply gas into other types of analytical device, especially vacuum pumped devices where gas is to be provided at a number of different selected pressures.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

It will be appreciated that variations to the foregoing embodiments of the invention can be made while still falling with the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A gas inlet system for providing a stream of gas into an analytical apparatus, comprising:
    a gas inlet line, for delivering gas into the analytical apparatus, the gas inlet line being connectable to the analytical apparatus to introduce gas into the apparatus, and to at least one gas supply, to deliver gas into the gas inlet line;
    at least one gas flow restriction assembly that is arranged on, or fluidly connected to, the gas inlet line, the flow restriction assembly comprising at least two switchable flow restrictions;
    at least one control line that is fluidly connected to the gas inlet line at a control line junction, downstream from the at least one gas flow restriction assembly, the control line comprising at least one back pressure regulator and at least one valve for regulating gas flow into the control line, and at least one vacuum pump that is arranged downstream from the back pressure regulator; and at least one inlet gas flow restriction that is arranged on the gas inlet line, between the control line junction and the analytical apparatus.

2. The gas inlet system of claim 1, wherein the flow restriction assembly is provided as a parallel arrangement of flow restrictions, the flow restrictions being arranged on separate flow restriction gas lines that meet at a first restriction junction upstream from the flow restrictions and a second restriction junction downstream from the flow restrictions on the gas inlet line, upstream from the control line junction.

3. The gas inlet system of claim 1, wherein the flow restriction assembly is provided as a parallel arrangement of two flow restrictions, wherein one of the flow restrictions is arranged on the gas inlet line and wherein the second of the flow restrictions is provided on a bypass gas line that is arranged parallel to the gas inlet line and that meets the gas inlet line at a first restriction junction upstream from the flow restrictions and a second restriction junction downstream from the flow restrictions, upstream from the control line junction.

4. The gas inlet system of claim 1, wherein the flow restriction assembly is provided as a parallel arrangement of two flow restrictions, wherein one of the flow restrictions is arranged on the gas inlet line and wherein the second of the flow restrictions is provided on a bypass gas line that is arranged parallel to the gas inlet line and that meets the gas inlet line at a first restriction junction upstream from the flow restrictions and a second restriction junction on the control line, between the mass flow regulator and the control line junction.

5. The gas inlet system of claim 4, further comprising at least one further flow restriction, wherein each such further flow restriction is arranged on a separate further gas line that is arranged parallel to the first and second flow restrictions in the flow restriction assembly.

6. The gas inlet system of claim 4, wherein the flow restriction assembly comprises two or more parallel flow restrictions that are adapted such that the ratio of gas flow through any two of the flow restrictions, for the same pressure difference across the restrictions, is in the range of about 1:20 to 1:1.5.

7. The gas inlet system of claim 1, wherein the analytical apparatus is a mass spectrometer.

8. The gas inlet system of claim 7, wherein the gas inlet line is fluidly connected to a collision cell of the mass spectrometer.

9. The gas inlet system of claim 1, wherein the vacuum pump is fluidly connected to the control line and is part of a vacuum pumping system of a mass spectrometer.

10. A system for calibrating gas flow in a gas inlet system for an analytical apparatus, the system comprising:
a gas inlet line, for providing gas into an analytical apparatus;
a gas flow calibration line that is fluidly connected to the gas inlet line via a first calibration junction, the gas flow calibration line comprising at least one gas flow meter; and
at least one valve, for selectively directing gas flow either into the analytical apparatus via the gas inlet line or into the gas flow calibration line via the first calibration junction;
such that gas flow in the system can, in a first gas flow setting of the at least one valve, be directed into the analytical apparatus via the gas inlet line, bypassing the gas flow calibration line, and in a second gas flow setting of the at least one valve be directed via the gas flow calibration line into the analytical apparatus,
whereby gas flow that is measured in the gas flow calibration line in the second gas flow setting is, given a constant gas flow in the gas inlet line towards the calibration junction, a measure of the gas flow into the analytical apparatus in the first gas flow setting.

11. The system of claim 10, wherein the gas flow calibration line is further connected to the gas inlet line at a second calibration junction, such that gas flow in the system is, in the second setting, directed through the gas flow calibration line, from the first calibration junction to the second calibration junction, and into the analytical apparatus via a gas inlet junction that connects the gas inlet line to the analytical apparatus, downstream from the second calibration junction.

12. The system of claim 10, wherein the gas flow calibration line is further connected to the analytical apparatus through a calibration inlet junction that is fluidly separate from a gas inlet junction, between the gas inlet line and the analytical apparatus, such that gas flow in the system is, in the second setting, directed through the gas flow calibration line, from the first calibration junction to the calibration inlet junction and into the analytical apparatus.

13. The system of claim 10, further comprising a housing that is adapted to enclose the system and that further comprises means for maintaining the system at a constant temperature.

14. The system of claim 13, wherein the housing encloses at least the gas flow calibration line and the portion of the gas inlet line that stretches from the first calibration junction to the analytical apparatus.

15. The system of claim 10, wherein the analytical apparatus is a mass spectrometer.

16. The system of claim 15, wherein the gas inlet line and the calibration line are fluidly connected to a collision cell of a mass spectrometer.

17. The system of claim 10, further comprising at least one controller, for controlling the position of valves and/or gas flow regulators or controllers in the system.

18. A method of adjusting gas flow in a gas inlet system of an analytical apparatus, the method comprising steps of:
flowing gas at an inlet pressure ($P_{in}$) from at least one gas supply into a gas inlet line that provides gas into an analytical apparatus;
regulating flow rate in the gas inlet line by splitting away a portion of the gas flow in the gas inlet line into a gas control line that is arranged on the gas inlet line and that meets the gas inlet line at a control line junction, such that a portion of the gas flow in the gas inlet line flows through the gas control line, and wherein gas flow in the gas control line is controlled by means of a back pressure regulator, whereby at a first setting of the gas flow controller gas flow rate in the gas inlet line and/or a pressure ($P_A$) at the control line junction reaches a constant first value;
adjusting the flow controller to a second setting and while the flow controller is in the second setting, flowing gas from the gas supply at least into one or more bypass gas line that is fluidly connected to the gas inlet line, between the gas supply and the control line junction; and
maintaining gas flow through the bypass gas line until gas flow and/or pressure ($P_A$) at the control line junction has reached a constant second value.

19. The method of claim 18, wherein gas is allowed to flow through the at least one bypass gas line while simultaneously maintaining gas flow through the gas inlet line.

20. The method of claim 19, wherein the portion of gas flow that is split away from the gas inlet line into the bypass gas line is in the range of about 50% to about 98% of the total gas flow.

21. The method of claim 18, wherein the ratio of gas flow rate through the gas inlet line to the gas flow rate through the bypass gas line, for the same pressure difference across the restrictions, is in the range of about 1:20 to 1:1.5.

22. The method of claim 18, further comprising diverting gas flow through a first bypass gas line for a first period of time to achieve a first gas flow rate at the control line junction, and diverting gas flow through a second bypass gas line that is arranged in parallel with the first bypass gas line for a second period of time to achieve a second gas flow rate at the control line junction, wherein the first and second bypass gas lines comprise different flow restrictions so that flow through the two bypass lines is different for a given fixed gas pressure difference across the bypass lines,     whereby gas flow at the control line junction can be adjusted from a first flow rate to a second flow rate by selectively allowing gas flow through the first bypass gas line, and gas flow at the control line junction can be adjusted to a third flow rate by selectively allowing gas flow through the second bypass gas line.

23. The method of claim 18, wherein the analytical apparatus is a mass spectrometer.

24. The method of claim 23, wherein the gas is delivered into a collision cell of the mass spectrometer.

* * * * *